(12) United States Patent
Visser et al.

(10) Patent No.: US 8,945,651 B2
(45) Date of Patent: Feb. 3, 2015

(54) PROCESS FOR PREPARING MAILLARD FLAVOUR PREPARATIONS

(75) Inventors: Jan Visser, Huizen (NL); Harry Renes, Lelystad (NL); Chris Winkel, Bussum (NL); Caroline de Lamarliere, Naarden (NL)

(73) Assignee: Givaudan Nederland Services B.V., Naarden (NL)

( * ) Notice: Subject to any disclaimer, the term of this patent is extended or adjusted under 35 U.S.C. 154(b) by 1459 days.

(21) Appl. No.: 11/547,312

(22) PCT Filed: Apr. 6, 2005

(86) PCT No.: PCT/NL2005/000258
§ 371 (c)(1),
(2), (4) Date: Jul. 30, 2007

(87) PCT Pub. No.: WO2005/096844
PCT Pub. Date: Oct. 20, 2005

(65) Prior Publication Data
US 2008/0038428 A1    Feb. 14, 2008

(30) Foreign Application Priority Data

| Apr. 6, 2004 | (EP) | 04076080 |
| Apr. 26, 2004 | (EP) | 04076247 |
| Oct. 29, 2004 | (EP) | 04077980 |
| Feb. 1, 2005 | (EP) | 05100657 |

(51) Int. Cl.
| A23L 1/227 | (2006.01) |
| A23L 1/226 | (2006.01) |
| A23L 1/229 | (2006.01) |
| A23L 1/231 | (2006.01) |
| A23L 1/30 | (2006.01) |

(52) U.S. Cl.
CPC ............ *A23L 1/2275* (2013.01); *A23L 1/22642* (2013.01); *A23L 1/22678* (2013.01); *A23L 1/229* (2013.01); *A23L 1/231* (2013.01); *A23L 1/3018* (2013.01)

USPC ........... 426/533; 426/536; 426/537; 426/534; 426/650

(58) Field of Classification Search
CPC ............ A23L 1/22642; A23L 1/22678; A23L 1/3018; A23L 1/229; A23L 1/231; A23L 1/2275
USPC .................. 426/533, 534, 535, 536, 537, 538
See application file for complete search history.

(56) References Cited

U.S. PATENT DOCUMENTS

| 3,532,514 A | 10/1970 | May | |
| 4,166,869 A * | 9/1979 | Flament | 426/537 |
| 4,466,986 A * | 8/1984 | Guggenbuehler et al. | 426/533 |
| 4,552,776 A * | 11/1985 | Tse | 426/597 |
| 4,879,130 A * | 11/1989 | Heyland et al. | 426/533 |
| 2003/0118709 A1* | 6/2003 | Nakamura | 426/534 |

FOREIGN PATENT DOCUMENTS

| EP | 0 571 031 | 11/1993 |
| EP | 1 008 305 | 6/2000 |
| EP | 1 252 825 | 10/2002 |

* cited by examiner

*Primary Examiner* — Rena L Dye
*Assistant Examiner* — Assaf Zilbering
(74) *Attorney, Agent, or Firm* — The Webb Law Firm

(57) ABSTRACT

The present invention relates to a process of producing Maillard flavor preparation, such as process flavors, comprising heating a combination of a carbohydrate source and a nitrogen source in a continuous liquid phase containing at least 10 wt % of an α-hydroxycarboxylic acid component selected from the group of α-hydroxycarboxylic acids according to the following formula (I): $R^1\text{—}CR^2(OH)\text{—}COOH$ salts of these acids and combinations thereof. It was found that the flavor preparations so obtained exhibit unique flavor profiles, making them particularly suitable for use in foodstuffs, beverages, pharmaceutics, tobacco products and oral care products.

17 Claims, No Drawings

PROCESS FOR PREPARING MAILLARD FLAVOUR PREPARATIONS

FIELD OF THE INVENTION

The present invention relates to the field of Maillard flavour preparations, such as process flavours, and to methods of producing said Maillard flavour preparations and process flavours, in particular it relates to a new process comprising heat induced reaction of a carbohydrate source and a nitrogen source.

BACKGROUND OF THE INVENTION

For as long as food has been cooked, the Maillard reaction has played an important role in improving the appearance and taste of foods. Controlling Maillard reactions has been a central and major challenge in food industry, because aroma, taste and sensorial properties as well as colour are all strongly affected by Maillard chemistry, particularly in traditional processes such as the roasting of coffee and cocoa beans, the baking of bread and cakes, the toasting of cereals and the cooking of meat.

Maillard reaction technology is used by the flavour industry for the production of so-called process or reaction flavours. Process flavours are complex aroma building blocks, which provide similar aroma and taste properties as thermally treated foodstuffs such as cooked meat, chocolate, coffee, caramel, popcorn and bread. Additionally, they can be combined with other flavour ingredients to impart flavour enhancement and/or specific flavour notes in the applications in which they are used.

During the Maillard reaction a wide range of reaction products is formed with significant importance for amongst others the taste of foods. The chemistry underlying the Maillard reaction is very complex. It involves not one reaction pathway but a whole array of various reaction cascades. The Maillard reaction is most commonly known as the reaction of an amino group of e.g. an amino acid, peptide or protein, with the keto group of a sugar, followed by other, more complex changes which result eventually in the formation of a variety of volatiles and non-volatiles.

It is known, for example, that reaction products obtained by heating a mixture of sulphur-containing amino acids and reducing sugar, have a characteristic flavour similar to roasted or cooked meat to some extent. These Maillard reaction products can suitably be employed as flavouring material for foodstuffs.

Though the understanding of the reaction by food technologists is advancing steadily, the Maillard reaction is notoriously difficult to control. The rate of the Maillard reaction and the nature of the products formed are not only dependant on the reactants present but are also greatly influenced by the reaction conditions. These include the pH and water activity, the presence of oxygen and metals, the temperature-time combination during heating and the presence of reaction inhibitors (like sulphur dioxide). These factors together determine the development of the Maillard reaction during processing, thereby having a high impact on both intensity and quality of the obtained process flavour.

Generally speaking, the Maillard reaction is most effective in generating flavour components when the water activity is low. That is one reason why the outer crust of meat and bread or roasted coffee beans do contain high concentrations of Maillard reaction products in the form of volatile molecules (aroma) and non-volatile molecules (colour and taste).

In order to make Maillard flavours with a broad range of aroma compounds and to do so as efficiently as possible, i.e. in higher yields and/or at a higher reaction rate, several methods using liquid phases with low water activity have been proposed.

In U.S. Pat. No. 4,879,130 a method of producing a flavouring agent is described, wherein a paste-like mixture prepared from 70-95 wt % of a source of free amino acids, 1-25 wt % of additives, including at least one reducing sugar and water, is heated and kneaded in order to plasticize it. After extrusion the plasticized mixture is further heated in order to react. After drying and cooling a flavorant is obtained.

In EP-A-1 008 305 a method for producing an aroma product is disclosed wherein saturated C16-C18 monoglycerides are added to an aqueous dispersion of amino acids, peptides or hydrolysed protein and reducing sugars and wherein the mixture is subsequently heated to obtain a micro emulsion. By continuous heating of the micro emulsion flavouring compounds develop.

In EP 0 571 031 a process for the preparation of a savoury flavour is described which comprises reacting mono and or di-methyl-3(2H)-furanone with cystein and or hydrogen sulphide. The reaction is carried out in a medium comprising an organic polar solvent such as glycerol or propylene glycol and less than 20% of water. In addition, a food acid, such as acetic acid, may be present in order to stabilize the thiols present, resulting in higher yields of one of the important meat flavour compounds. According to this document the acetic acid is added in an amount of about 41 mmol/kg.

SUMMARY OF THE INVENTION

The present inventors have surprisingly found that Maillard flavour preparations, including process flavours, with unique flavour profiles can be obtained by carrying out a heat-induced reaction of a carbohydrate source and a nitrogen source in a liquid continuous phase comprising at least 10 wt. % of an α-hydroxycarboxylic acid and/or a salt thereof.

The Maillard flavour preparations and process flavours obtained by this process were found to have remarkable flavour characteristics and are particularly useful for imparting pleasant flavour notes to foodstuffs, beverages, pharmaceutics, tobacco products and oral care products.

DETAILED DESCRIPTION OF THE INVENTION

Therefore, in a first embodiment the present invention relates to a process of producing Maillard flavour preparations, preferably a process flavour, comprising heating a combination of a carbohydrate source and a nitrogen source, in a continuous liquid phase containing at least 10 wt. %, preferably at least 30 wt. %, of an α-hydroxycarboxylic acid component selected from the group consisting of α-hydroxycarboxylic acids represented by the following formula (I):

$$R^1—CR^2(OH)—COOH \qquad (I)$$

salts of these acids and mixtures thereof; wherein $R^1$ and $R^2$ independently represent hydrogen; $C_1$-$C_8$ alkyl or $C_2$-$C_8$ alkenyl, each optionally substituted with 1-8 substituents selected from hydroxyl, oxo, $C_1$-$C_3$ alkyl; $C_2$-$C_3$ alkenyl and $C_1$-$C_3$ carboxyl.

The term "Maillard flavour preparation" as used herein refers to a flavour preparation which is obtained by heating a mixture of ingredients including a nitrogen source, preferably amino nitrogen, and a carbohydrate source, preferably a reducing sugar.

As mentioned herein before, it is particularly preferred that the present Maillard flavour preparation is a process flavour. The terms "process flavour" or "reaction flavour" which are used interchangeably herein refer to compositions or products obtained by heat processing together a protein nitrogen source and a carbohydrate source (IOFI Guidelines for the Production and Labelling of Process Flavourings 1989). According to the IOFI Guidelines the protein nitrogen source is to be selected from:

protein nitrogen containing foods (meat, poultry, eggs, dairy products, fish, seafood, cereals, vegetable products, fruits, yeasts) and their extracts hydrolysis products of the above, autolyzed yeasts, peptides, amino acids and/or their salts.

According to these same guidelines the carbohydrate source is to be selected from:

foods containing carbohydrates (cereals, vegetable products and fruits) and their extracts mono-, di- and polysaccharides (sugars, dextrins, starches and edible gums)

hydrolysis products of the above.

In a preferred embodiment of the present process, the temperature of the combination of processed components does not exceed 180° C. (IOFI Guidelines 4.3.1.). Furthermore, preferably, the processing time shall not exceed ¼ hour at 180° C., with correspondingly longer times at lower temperatures (IOFI Guidelines 4.3.2.).

The term "liquid" as used herein in relation to the continuous liquid phase refers to the fact that, especially under the heating conditions employed, the continuous phase exhibits fluid or flowing behaviour. Furthermore, it should be understood that the term liquid embraces emulsions and suspensions.

According to a preferred embodiment of the present invention the process is performed in a continuous liquid phase containing at least 40 wt %, more preferably at least 45 wt %, most preferably at least 50 wt % of the α-hydroxycarboxylic component. The present continuous liquid phase advantageously comprises water in an amount sufficient to liquefy the α-hydroxycarboxylic acid component, e.g. in an amount of at least 2 wt. %, even more preferably at least 5 wt. %. It is preferred that the amount of water does not exceed 70 wt. %, based on the total weight of the continuous liquid phase, preferably it does not exceed 60 wt. %, more preferably it does not exceed 45 wt. %. Optionally, the continuous liquid phase may contain other solvents known to facilitate the occurrence of the Maillard reaction, e.g. glycerol, propyleneglycol, xylitol and/or sorbitol.

According to the present invention the term "nitrogen source" preferably refers to a protein nitrogen source, autolyzed yeasts, peptides, amino acids and/or their salts, decarboxylated amino acids, nucleosides, nucleotides, salts thereof and mixtures thereof.

According to a particularly preferred embodiment, the present nitrogen source is a protein nitrogen source selected from protein nitrogen containing foods (meat, poultry, eggs, dairy products, fish, seafood, cereals, vegetable products, fruits, yeasts), extracts thereof and hydrolysis products thereof, autolyzed yeasts, peptides, amino acids and/or their salts. More preferably the present nitrogen source is selected from the group of free amino acids, peptides, proteins and mixtures thereof. Typical examples of compositions providing the nitrogen source include synthesised amino acids, protein hydrolysates and proteins originating from vegetable, animal and/or yeasts, e.g. dairy protein, cereal protein, meat protein, soy protein and protein from yeast extracts.

The carbohydrate source can be any type conventionally used in the field of process flavours and Maillard flavour preparations. Preferably the carbohydrate source comprises a reducing sugar. Non-limiting examples include ribose, xylose, glucose, fructose, rhamnose, lactose, maltose and sucrose. Preferably the carbohydrate source is selected from the group of xylose, glucose, fructose, lactose, rhamnose and mixtures thereof.

According to a preferred embodiment, in formula (I), $R^1$ aid $R^2$ independently represent hydrogen; or $C_1$-$C_8$ alkyl, optionally substituted with 1-8 substituents selected from hydroxyl, oxo, $C_1$-$C_3$ alkyl; $C_2$-$C_3$ alkenyl and $C_1$-$C_3$ carboxyl.

According to a first particularly preferred embodiment, in formula (I), $R^1$ represents hydrogen or $C_1$-$C_3$ alkyl, more preferably it represents $C_1$-$C_2$ alkyl, most preferably methyl.

Alternatively, in a second particularly preferred embodiment $R^1$ represents $C_2$-$C_8$ alkyl said alkyl being substituted with 1-6 hydroxyl groups and/or 1-3 carboxyl groups and/or 1-3 oxo groups. Even more preferably, $R^1$ represents $C_2$-$C_6$ alkyl, substituted with 2-6 hydroxyl groups and/or 1 carboxyl group and/or 1 oxo group. Still more preferably, $R^1$ represents $C_3$-$C_5$ alkyl, substituted with 3-5 hydroxyl groups. Most preferably $R^1$ represents $CH_2OH$—$(CHOH)_3$—.

In the aforementioned formula (I) $R^2$ preferably represents hydrogen or $C_1$-$C_4$ alkyl, most preferably hydrogen.

In the case that $R^1$ and/or $R^2$ represent $C_2$-$C_8$ alkyl comprising an oxo or hydroxy substituent at the γ or δ carbon atom, reversible ring closure between the keto or hydroxy substituent and the carboxylic acid group may occur in the presence of water, yielding the anhydride of the α-hydroxycarboxylic acid. The use of such lactones, which exist in equilibrium with their aliphatic α-hydroxycarboxylic acids, is also encompassed by the present invention.

Examples of α-hydroxycarboxylic acids that can advantageously be applied in accordance with the present invention include: lactic acid, malic acid, tartaric acid, citric acid, ascorbic acid, gluconic acid, glucuronic acid and galacturonic acid. Therefore, in a particularly preferred embodiment the α-hydroxycarboxylic acid component is selected from lactic acid, malic acid, tartaric acid, citric acid, ascorbic acid, gluconic acid, glucuronic acid, galacturonic acid, salts of these acids and mixtures thereof. More preferably the α-hydroxycarboxylic acid component is selected from the group consisting of lactic acid, malic acid, tartaric acid, gluconic acid, glucuronic acid, galacturonic acid, salts of these acids and mixtures thereof. Even more preferably, the α-hydroxycarboxylic acid component is selected from the group consisting of lactic acid, lactic acid salts, gluconic acid, gluconic acid salts and mixtures thereof, still more preferably lactic acid, gluconic acid and mixtures thereof.

In a particularly preferred embodiment, the α-hydroxycarboxylic acid component is lactic acid. Preferably, the continuous liquid phase comprises, based on the total weight of the continuous liquid phase, an amount of water of between 2-30 wt %, more preferably 5-20 wt. %, most preferably 5-15 wt %, and lactic acid in an amount of at least 10 wt %, more preferably at least 30 wt %, most preferably at least 50 wt %.

In another particularly preferred embodiment the α-hydroxycarboxylic acid component is gluconic acid. Preferably, the continuous liquid phase comprises, based on the total weight of the composition, an amount of water of between 20-70 wt %, more preferably 30-60 wt. %, most preferably 40-55 wt %, and gluconic acid in an amount of at least 10 wt %, more preferably at least 30 wt %, most preferably at least 45 wt %.

It was found that the present process yields particularly advantageous flavour profiles if additionally one or more nucleotides and/or nucleosides are included in the combination of components that is subjected to heating. The nucleosides are suitably selected from the group of guanosine, inosine, adenosine, cytidine, uridine and combinations thereof, preferably from the group of guanosine, inosine, adenosine, cytidine and combinations thereof. The nucleotides are preferably selected from the group of GMP (guanosine monophosphate), IMP (inosine monophosphate), AMP (adenosine monophosphate), CMP (cytidine monophosphate), UMP (uridine monophosphate), GDP (guanosine diphosphate), ADP (adenosine diphosphate), CDP (cytidine diphosphate), UDP (uridine diphosphate), GTP (guanosine triphosphate), ATP (adenosine triphosphate), CTP (cytidine triphosphate)), UTP (uridine triphosphate) and combinations thereof, more preferably they are selected from GMP, IMP, AMP, CMP, GDP, ADP, CDP, GTP, ATP, CTP and combinations thereof. Even more preferably, the nucleotides are selected from CMP, IMP, GMP and combinations thereof. Particularly satisfying results can be obtained if GMP and/or IMP are used, GMP being most preferred.

In a preferred embodiment the one or more nucleosides and/or nucleotides are included in an amount of 2-100%, more preferably 2-95%, still more preferably 5-35% by weight of the nitrogen source. In a particularly preferred embodiment the nitrogen source is provided by yeast extracts. Suitable examples of such yeast extracts include AROM-ILD™ process flavour (Kohjin), UMAMEX I™ process flavour and YEP LLS process flavour (both ex Quest, Naarden, the Netherlands). It was found that by using said starting materials flavour preparations are obtained that are particularly suitable for use in dairy, snacks and culinary applications.

In a preferred embodiment of the present process the nitrogen source and the carbohydrate source are employed in a weight ratio within the range of 1:20 to 20:1. In another preferred embodiment the employed weight ratio of α-hydroxycarboxylic acid component relative to the combination of carbohydrate source and nitrogen source is within the range of 1:1 to 20:1, more preferably within the range of 2:1 to 10:1.

In the present process the combination of carbohydrate source, nitrogen source and liquid phase is heated in order to accelerate the reaction. The aroma profile so obtained is dependent on the nature of the reactants and the temperature and time of heating.

In the present process it is preferred to heat the combination of carbohydrate source, nitrogen source and liquid phase to a temperature of between 60-180° C., even more preferably between 100-140° C. According to a preferred embodiment the heating is carried out for a period of 0.1-8 hours, preferably of 0.5-5 hours.

The combination of heating time and temperature employed in the present process is advantageously controlled in such a way that the following conditions are met:

$$60 < T < 180, \text{ and}$$

$$t > 0.2 * 2^{((180-T)/10)}$$

wherein T is the temperature expressed in degrees Celsius and t is the time of heating expressed in minutes.

In a particularly preferred embodiment the present process comprises heating a combination comprising hydrolysed dairy proteins, for example NZ AMINE™ casein hydrolysate powder (ex Quest, Naarden, the Netherlands) and a carbohydrate source, preferably lactose, in a continuous phase containing at least 10 wt. %, even more preferably at least 30 wt. % α-hydroxycarboxylic acid component, preferably an α-hydroxycarboxylic acid component selected from gluconic and lactic acid, most preferably lactic acid.

A further aspect of the present invention relates to flavour preparations obtainable by the present process.

According to another embodiment, the present invention relates to a Maillard flavour preparation containing at least 0.001 wt. %, preferably at least 0.01 wt. % of substances represented by formula (II):

$$R^1-CR^2(OH)-CO-Y \quad \text{(II)}$$

wherein $R^1$ and $R^2$ have the same meaning as defined herein before and wherein Y represents an optionally substituted purine or a pyrimidine radical. Preferably, the purine or pyrimidine radical is esterified with a pentose monosaccharide unit, preferably ribose or deoxyribose, which pentose monosaccharide unit is optionally substituted with one or more mono-, di- and/or triphosphate groups. Most preferably, the pentose monosaccharide unit is esterified with one or more monophosphate groups. Typically, in formula (II), the CO—Y bond represents an amide bond or an ester bond. More particularly, it represents an amide bond connecting the acyl group with an amino group substituted on the purine or pyrimidine radical or with a nitrogen atom comprised in the heterocyclic ring of said purine or pyrimidine radical or alternatively an ester bond connecting the acyl group with an oxygen atom of a pentose monosaccharide unit substituted on the heteroyclic ring system.

The present process of producing Maillard flavour preparations, preferably process flavours, may optionally include drying of the obtained reaction mixture. Drying may suitably be done by any drying method known in the art of flavour technology. In a preferred embodiment the obtained reaction mixture is subjected to a conventional spray-drying process. Alternatively, when a liquid flavour preparation is desired the process may include concentrating the reaction mixture, e.g. to a paste.

Another aspect of the present invention relates to flavour compositions comprising the Maillard flavour preparations as described here above. In a preferred embodiment the flavour compositions comprise said flavour preparation in an amount of between 1-50 wt %, preferably of between 20-30 wt %, based on the dry weights of the flavour preparation and the flavour composition it is comprised in.

Still another aspect of the present invention relates to products selected from the group of foodstuffs, beverages, pharmaceutics, tobacco products and oral care products comprising 0.0001-3 wt %, more preferably 0.01-3 wt %, of the present Maillard flavour preparation. Typical examples of foodstuffs according to the present invention include yoghurt, ice cream, desserts, confectioneries, bakery products, snacks, seasonings, sauces, stock, soups and dressings. The benefits of the present invention may also be realised in beverages, in oral care products such as toothpaste and mouthwash, in pharmaceutics such as pills and elixirs, and in tobacco products, which includes any type of tobacco product for smoking as well as for non-smoking applications. It is noted that tobacco-like products are available for both smoking and non-smoking applications. The use of the present taste improving substances in these tobacco substitutes is also encompassed by the present invention.

Yet another aspect of the present invention relates to a method of flavouring a product selected from the group of foodstuffs, beverages, pharmaceutics, tobacco products and oral care products, said method comprising adding to said product 0.0001-3 wt %, more preferably 0.01-3 wt %, of the present Maillard flavour preparation, preferably being a process flavour.

The invention is further illustrated by means of the Following examples.

EXAMPLES

Example 1

A mixture of 2.7 g UMAMEX I™ process flavour and 0.3 g dextrose was dissolved in 9 g of lactic acid (90% lactic acid, 10% water). The reactor was closed and the mixture was reacted at 120° C. for 1 hour. After cooling 10 ml of water was added and the pH was adjusted to 6. 10 g of the obtained process flavour was spray-dried with 30 g of maltodextrin.

Example 2

A mixture of 2.4 g AROMILD™ process flavour and 0.6 g dextrose was dissolved in 9 g of lactic acid (90% lactic acid, 10% water). The reactor was closed and the mixture was reacted at 120° C. for 4 hours. After cooling 10 ml of water was added and the pH was adjusted to 6. 10 g of the obtained process flavour was spray-dried with 30 g of maltodextrin.

Example 3

A mixture of 22.5 g NZ AMINE™ EKC casein hydrolysate powder and 2.5 g dextrose was dissolved in 150 g of gluconic acid (50% gluconic acid, 50% water). The reactor was closed and the mixture was reacted at 120° C. for 4 hours. After cooling, 90 ml of water was added to 35 g of the reacted mixture and the pH was adjusted to 6 using NaOH (50% solution). 40 g of maltodextrin and 25 g of salt were then added and the whole mixture was spray-dried.

Example 4

Three different tomato soup powder compositions were prepared by dry mixing the ingredients as given in table 1.

10 gram of each composition was mixed with 100 ml hot water to obtain tomato soups. The different soups were tasted and evaluated by a sensory panel. Product C, comprising the UMAMEX I™ process flavour, was clearly preferred over product B (50% salt reduction). Despite the reduced salt content of product C, the perceived saltiness of the product was comparable to that of product A. Furthermore, the taste of product C was described as having "more taste", "more impact", "more umami", "more kokumi", "long lasting" and "salivating".

TABLE 1

| Ingredients | A (Control) | B (50% Reduced salt) | C (Improved version) |
|---|---|---|---|
| Potato starch | 16.9 (g) | 16.9 (g) | 16.9 (g) |
| Tomato powder | 35 (g) | 35 (g) | 35 (g) |
| Sugar | 10 (g) | 10 (g) | 10 (g) |
| Fructose | 5 (g) | 5 (g) | 5 (g) |
| Milk powder | 20 (g) | 20 (g) | 20 (g) |
| Onion powder | 1.6 (g) | 1.6 (g) | 1.6 (g) |
| Garlic powder | 0.1 (g) | 0.1 (g) | 0.1 (g) |
| Carrot Powder | 0.1 (g) | 0.1 (g) | 0.1 (g) |
| MSG | 3.3 (g) | 3.3 (g) | 3.3 (g) |
| Yeast Extract | 1 (g) | 1 (g) | 1 (g) |
| Salt | 7 (g) | 3.5 (g) | 3.5 (g) |
| Maltodextrin | | 3.5 (g) | 1.5 (g) |
| UMAMEX I ™ process flavour (Ex. 1) | | | 2 (g) |
| Total | 100 (g) | 100 (g) | 100 (g) |

Example 5

Three aqueous solutions were prepared:
A. 0.5% NaCl
B. 0.3% UMAMEX I™ process flavour (as prepared in example 1)
C. 0.5% NaCl and 0.3% UMAMEX I™ process flavour (as prepared in example 1)

The solutions were tasted by a sensory panel:
Solution A was described as: "salty".
Solution B was described as: "weakly umami", "brothy", "slightly salty", "salivating".
Solution C was described as: "high impact", "bouillon", "meaty", "salty", "umami", "salivating", "long lasting".

Example 6

Three aqueous solutions were prepared:
A. 0.33% NaCl and 0.03% monosodium glutamate
B. 0.2% spray-dried process flavour of example 3
C. 0.33% NaCl, 0.03% monosodium glutamate and 0.2% spray-dried process flavour of example 3

The solutions were tasted by a sensory panel:
Solution A was described as: "salty", umami.
Solution B was described as: "weakly umami", "brothy", "slightly salty", "yeasty", "bitter".
Solution C was described as: "high impact", "bite", "old cheese-like bitter", "salty", "umami".

The invention claimed is:

1. A process of producing a Maillard flavour preparation, comprising heating a combination of a carbohydrate source and a nitrogen source in a continuous liquid phase containing at least 10 wt % of an α-hydroxycarboxylic acid component selected from the group consisting of lactic acid, malic acid, tartaric acid, ascorbic acid, gluconic acid, salts of these acids and mixtures thereof,
   wherein the combination of the carbohydrate source, the nitrogen source, and the continuous liquid phase is heated to a temperature of between 100 and 140 degrees Celsius for 0.5 to 5 hours.

2. The process according to claim 1, wherein the Maillard flavour preparation is a process flavour.

3. The process according to claim 1, wherein the α-hydroxycarboxylic acid component is selected from the group consisting of lactic acid, lactic acid salts, gluconic acid, gluconic acid salts and mixtures thereof.

4. The process according to claim 1, wherein the weight ratio of α-hydroxycarboxylic acid component relative to the combination of carbohydrate source and nitrogen source is within the range of 1:1 to 20:1.

5. The process according to claim 1, wherein the continuous liquid phase contains at least 30 wt % of the α-hydroxycarboxylic acid component.

6. The process according to claim 1, wherein the combination of carbohydrate source and nitrogen source additionally comprises one or more nucleosides and/or nucleotides, said nucleosides selected from the group consisting of guanosine, inosine, adenosine, cytidine and uridine, said nucleotides selected from the group consisting of GMP, IMP, AMP, CMP, UMP, GDP, ADP, CDP, GTP, ATP and CTP.

7. The process according to claim 1, further comprising heating to a temperature of at least 100° C. for at least 1 minute.

8. The process according to claim 1, wherein the nitrogen source and the carbohydrate source are employed in a weight ratio within the range of 1:20 to 20:1.

9. A process of producing a Maillard flavour preparation, comprising heating a combination of a carbohydrate source and a nitrogen source in a continuous liquid phase containing at least 10 wt % of an α-hydroxycarboxylic acid component selected from the group consisting of α-hydroxycarboxylic acids according to the following formula (I):

$$R^1—CR^2(OH)—COOH \qquad (I),$$

salts of these acids and combinations thereof; wherein $R^1$ and $R^2$ independently represent hydrogen, $C_1$-$C_8$ alkyl or $C_2$-$C_8$ alkenyl, and wherein the weight ratio of α-hydroxycarboxylic acid component relative to the combination of carbohydrate source and nitrogen source is within the range of 1:1 to 20:1.

10. A Maillard flavour preparation containing at least 0.001% by weight of substances represented by the following formula (II):

$$R^1—CR^2(OH)—CO—Y \qquad (II)$$

wherein $R^1$ and $R^2$ have the same meaning as defined in claim 9 and Y represents a purine or a pyrimidine radical.

11. A product selected from the group consisting of foodstuffs, beverages, pharmaceuticals, tobacco products and oral care products comprising 0.0001-3 wt % of a Maillard flavour preparation according to claim 10.

12. A process of producing a Maillard flavour preparation, comprising preparing a Maillard reaction comprising heating a combination of a carbohydrate source and a nitrogen source in a continuous liquid phase containing at least 10 wt % of an α-hydroxycarboxylic acid component selected from the group consisting of lactic acid, malic acid, tartaric acid, ascorbic acid, gluconic acid, salts of these acids and mixtures thereof.

13. The process according to claim 12, wherein the α-hydroxycarboxylic acid component is provided to influence flavour of the Maillard flavour preparation.

14. The process according to claim 1, wherein the combination of the carbohydrate source, the nitrogen source, and the continuous liquid phase is heated to a temperature of between 100 and 130 degrees Celsius for 0.5 to 4 hours.

15. The process according to claim 14, wherein the combination of the carbohydrate source, the nitrogen source, and the continuous liquid phase is heated to a temperature of 120 degrees Celsius for 1 to 4 hours.

16. The process according to claim 9, wherein the $C_1$-$C_8$ alkyl or $C_2$-$C_8$ alkenyl are each substituted with 1-8 substituents selected from hydroxyl, oxo, $C_1$-$C_3$ alkyl, $C_2$-$C_3$ alkenyl and $C_1$-$C_3$ carboxyl.

17. The Maillard flavor preparation according to claim 10, wherein the purine or pyrimidine radical is substituted with a pentose monosaccharide esterified with at least one monophosphate groups.

* * * * *